UNITED STATES PATENT OFFICE.

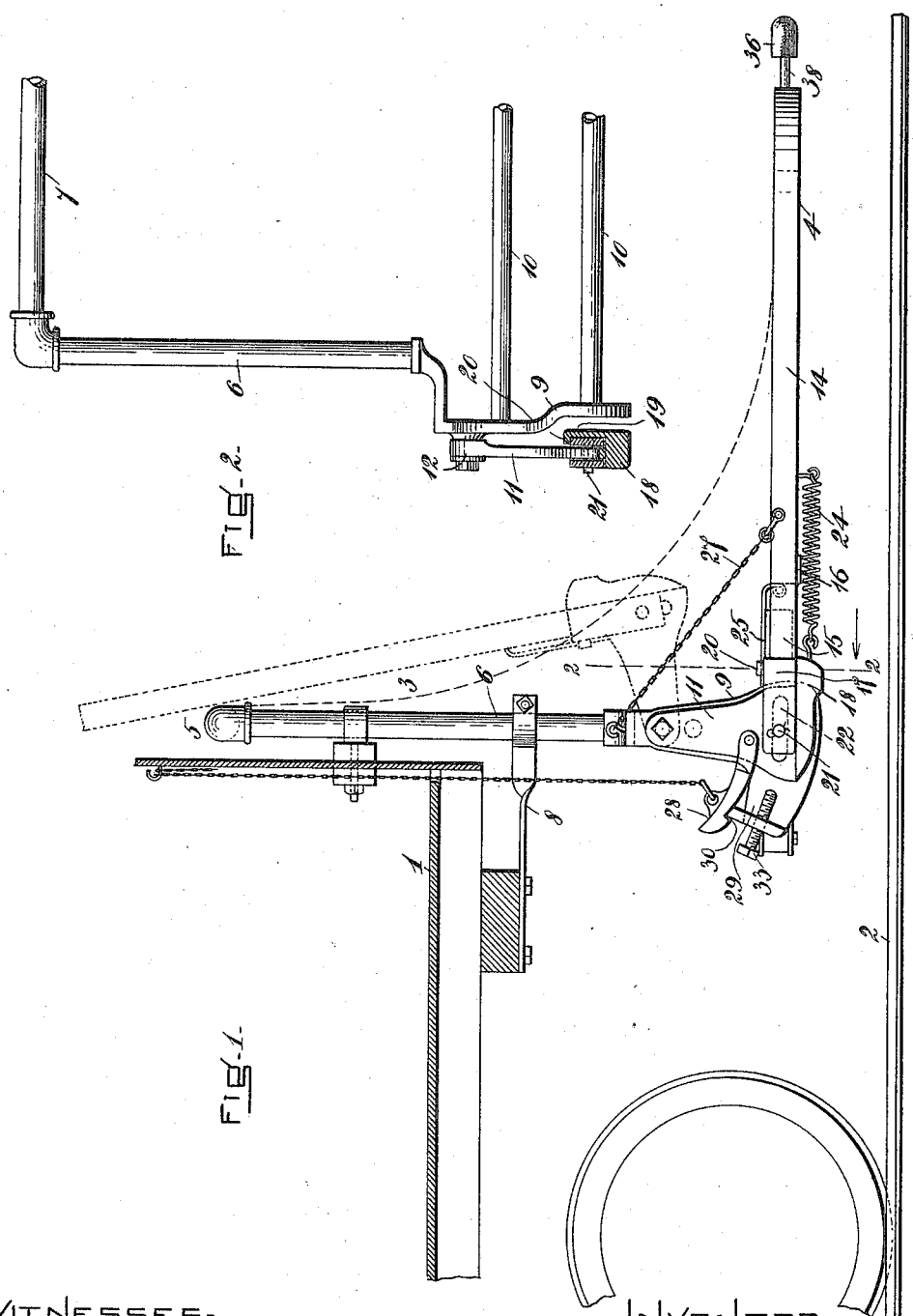

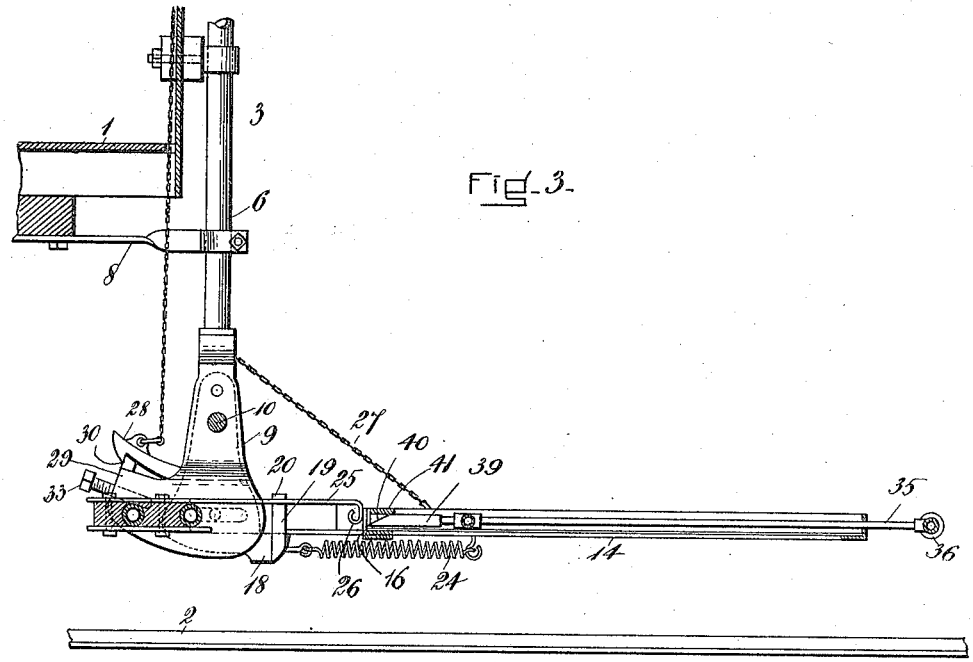
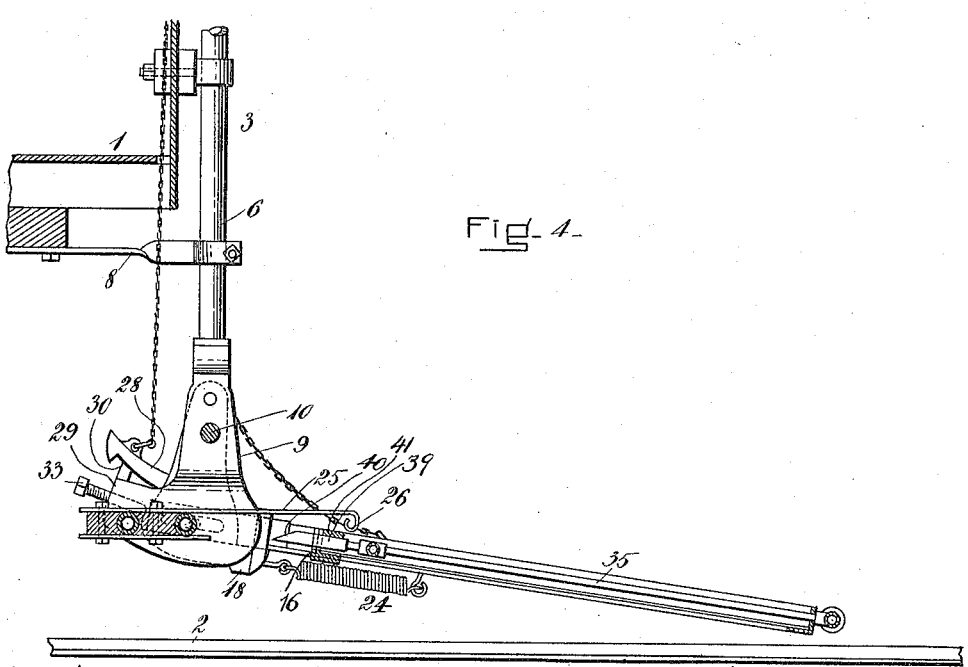

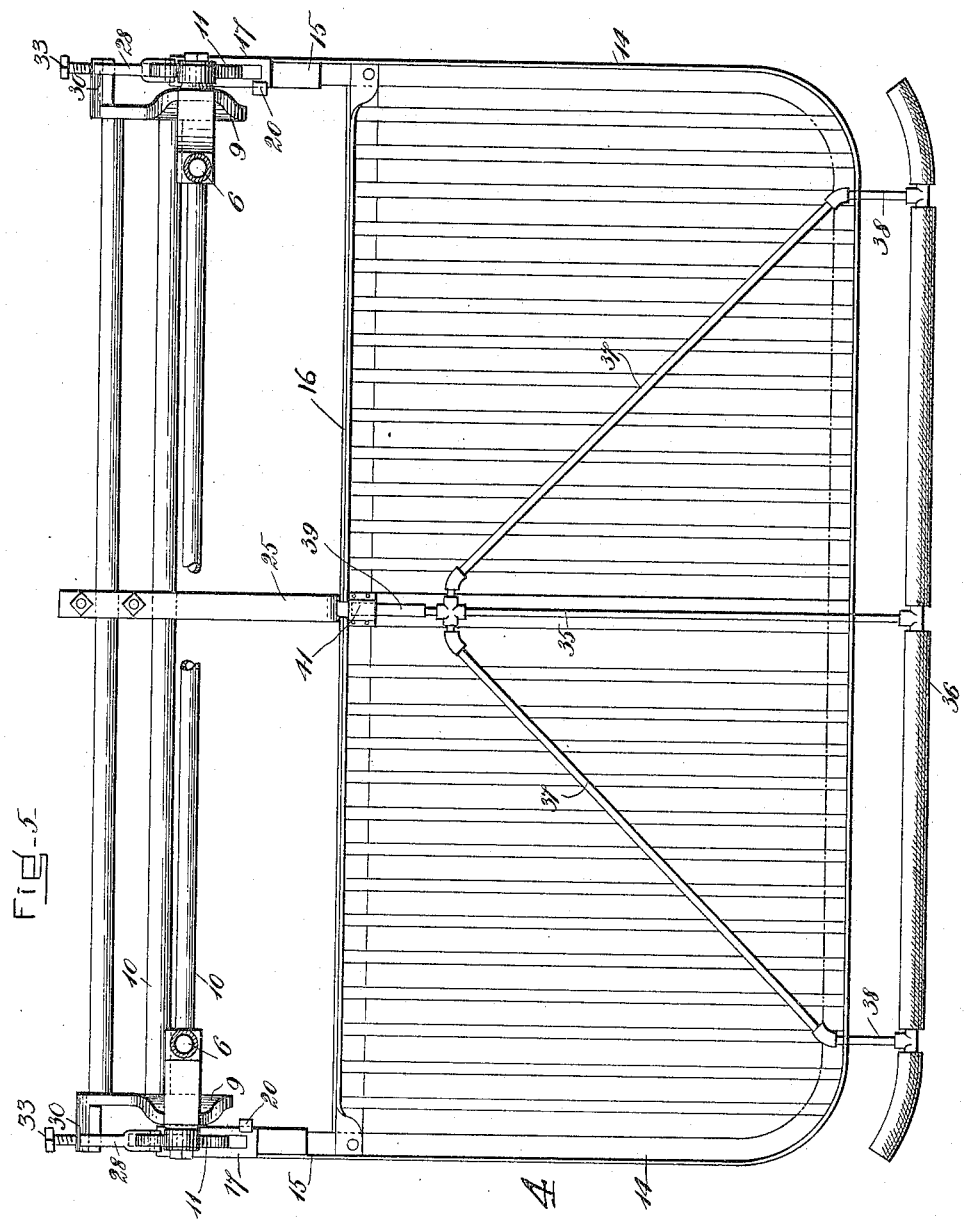

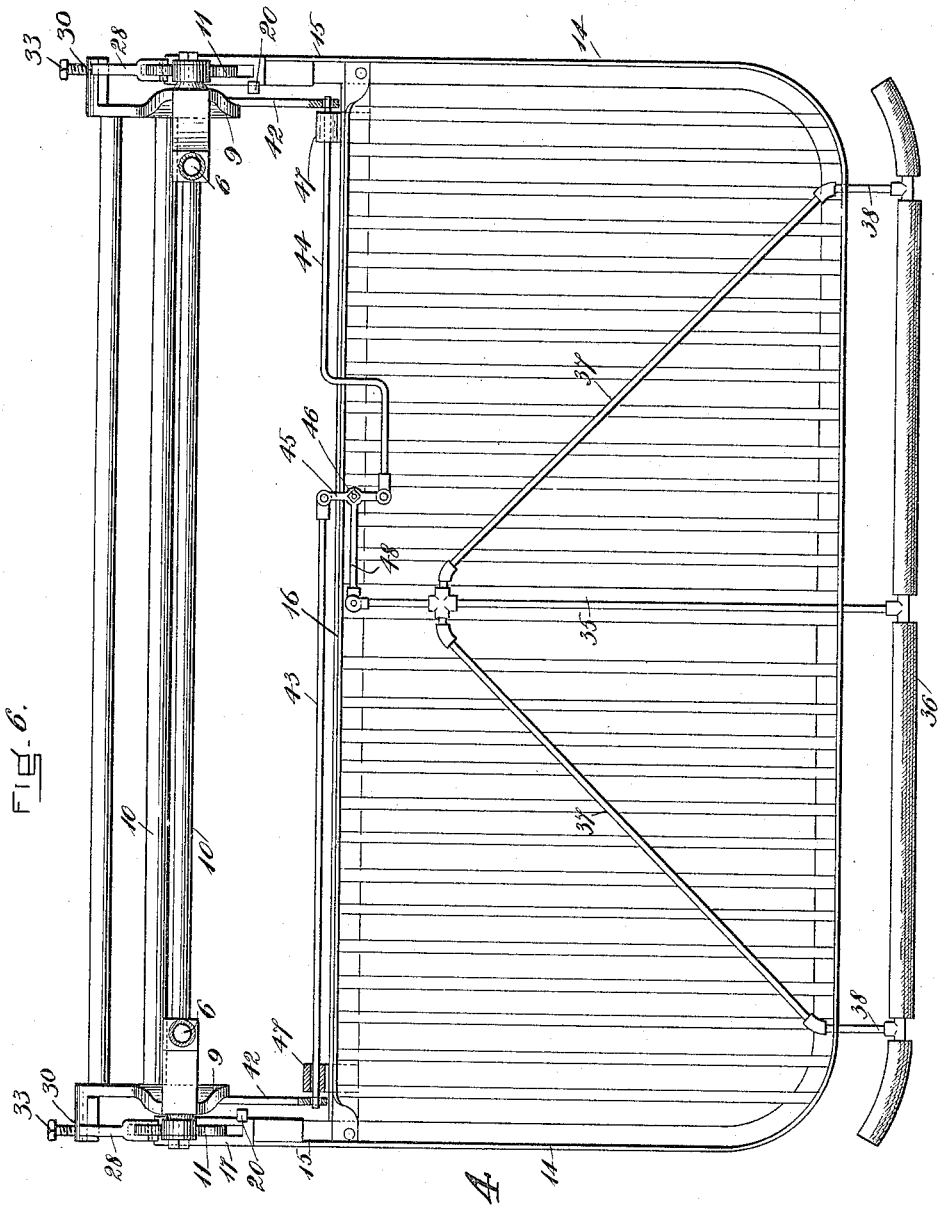

FRANK ROBINSON, OF BANGOR, MAINE.

FENDER.

1,145,705.

Specification of Letters Patent.

Patented July 6, 1915.

Application filed September 24, 1913. Serial No. 791,640.

*To all whom it may concern:*

Be it known that I, FRANK ROBINSON, of Bangor, in the county of Penobscot and State of Maine, a citizen of the United States, have invented a new and useful Improvement in Fenders, of which the following is a full, clear, and exact description, reference being had to the accompanying drawings, forming a part of this specification in explaining its nature.

The present invention relates to fenders especially adapted for use on electric cars and of that type or character which will become automatically tripped into an operative position by a person or object in the path of the car for picking up such person or object.

Among the objects of my invention is to provide a fender of the above character of relatively simple and light construction and which is capable of being applied to any car.

Essentially it is my object to provide a fender having an easy and positive operation. In this connection it is my endeavor to provide means whereby the fender may have a pronounced and positive recessive or backward movement, counter to the direction that the car is moving at the instant that it encounters an object and becomes tripped thereby into an operative position. It often happens that a car at the time it encounters a person or object is moving at a rapid rate and there is great danger that the person or object will get beneath the fender before it can assume its operative position. It is accordingly to guard against this danger that I have provided for a pronounced recessive movement of the fender as above referred to.

The fender comprising my invention can best be seen and understood by reference to the drawings, in which—

Figure 1 shows the fender in side elevation applied to the frame of a car, such portion only of the car being shown and rail or track on which the car is running as to exhibit the disposition and arrangement of the fender with relation to these parts. Fig. 2 is a front elevation of a portion of the fender to which reference will later be made. Figs. 3 and 4 are views partly in section and partly in elevation showing operative parts of the fender and especially the disposition and arrangement of these parts when the fender is in what will later be described as its engaging position, as shown in Fig. 3, and also in its tripped or operative position, as shown in Fig. 4. Fig. 5 is a plan of the fender. Fig. 6 is also a plan of the fender provided with a slightly modified type of tripping mechanism, as distinguished from the disclosure in Fig. 5.

Referring to the drawings:—1 represents a portion of the frame or body of the front end of the car; 2 a track or way upon which the car is mounted.

3 is the fender, the part 4 thereof forming the fender proper or guard, and by which name this portion of the fender will hereinafter be referred to. The guard 4 is carried by a frame 5 attached to the front end of the car. This frame comprises in part spaced uprights or posts 6 and a connecting headpiece 7, a rigid attachment of these parts to the front of the car being secured through any suitable attaching fixtures or brackets 8. From the bottom ends of the posts 6 there depend plates or castings 9 forming a portion of the frame 5 and between which are interposed connecting brace rods 10 which assist in giving rigidity to the entire frame.

Connecting with the portions 9 of the frame are supports 11 bearing the guard. These supports are arranged outside the respective portions 9 of the frame at either side thereof and are pivotally secured thereto at the points 12 respectively. From the points of their pivotal retention the supports extend downwardly in the manner of hangers and the guard connects with them at the bottom ends thereof to project forward therefrom, the guard and its respective supports or hangers being angularly arranged with respect to one another. In fact, I prefer that the extension of the guard shall be such that its plane shall be at substantially right angles to that of its supporting hangers. Thus pivotally supported, the guard may be turned through a range of movement extending from a vertically-turned or inoperative position as shown in the dotted lines of Fig. 1, through an engaging position as shown in full lines in Fig. 1 and in Fig. 3, to its operative position as shown in Fig. 4. These positions are thus referred to as inoperative, engaging and operative positions, respectively, for the reason that the position of the guard as shown in the dotted lines of Fig. 1 is one to which the guard may be turned when not in use and where it will be seen that the guard is capable, by the manner of its retention, of occupying a vertical position snug up against the end of the car, where it may be held by any suitable means of retention. This is the position generally occupied by the guard when at the rear end of a car. The position of the guard as shown in the full lines of Fig. 1 and in Fig. 3 is referred to as its engaging position for this is the normal position occupied by the guard for engaging a person or object to become tripped thereby and gravitate to the position shown in Fig. 4, which has been referred to as its operative position or one where the guard is enabled to pick up the person or object. The plane of the guard when in its engaging position is preferably a horizontal one parallel with the track or way over which the car is passing. The operative position of the guard is one in which the guard has a forward and downward inclination with the forward edge thereof approaching the roadbed over which the car is passing.

In connection with the retention of the guard, it is also to be observed that the guard is pivotally supported at a point some considerable distance outside the plane thereof or above its plane when the guard is occupying its engaging position. The advantage of this is that as the guard swings downwardly from its engaging to its inclined operative position, it will also swing backwardly in a direction counter to that in which the car is moving.

The guard is mounted upon the supports 11 which are pivoted on the frame 6 to have a longitudinal forward and retractive movement with relation thereto. In this connection it will be observed by reference to Fig. 5 that the guard is constructed in the usual manner with an outside frame 14 substantially rectangular in shape. The parts of this frame forming the sides of the guard extend backwardly by extensions 15 from that portion 16 of the frame forming the rear edge of the guard. Each extension 15 is provided with a split end 17. These split ends of the extensions slip over or straddle the respective supports or hangers 11 and rest upon base pieces 18 with which each support is provided. These base pieces 18 are also each provided, as shown in Fig. 2, with an upward extension 19 and turned edge 20 which extends upwardly alongside the respective frame extensions 15 and turns inwardly over the same for holding them in place and permitting of a sliding movement thereof in their respective supports or hangers. A further retention and bearing is provided by crosspins 21 fixed to their respective ends 17, which extend through slots 22 formed in the respective supports or hangers. These slots are of considerable length and by their extension define the extent of forward-extended and retracted movement of the guard with relation to its supports 11 or frame 5 to which these supports are pivoted, the engagement of the crosspins 21 with the parts forming the forward edges of the slots defining the forward-extended position of the guard and the engagement of the pins with the parts forming the rear edges of the slots defining the retracted position of the guard.

Secured to the respective base pieces 18 of the supports and connecting also with the frame 5 of the guard at the respective sides thereof are springs 24. These springs acting as a tensional means, normally operate to hold the guard in a retracted position as above indicated.

Reference will now be made to the means operating to hold the guard in an engaging position and at the same time in a forward-extended position against the tension of the springs 24. Fixed to certain ones of the bars 10 of the main frame 5 is a spring-bar 25 provided with a bent forward end 26. This spring-bar is preferably so disposed as to lie in the same plane as the guard when in an engaging position and so that the forward bent edge of the bar may engage the rear edge 16 of the guard at about the center thereof. The length of the spring-bar is also such that when the bent end or head of the bar is engaging the guard as aforesaid it will also operate to hold the guard in a forward-extended position against the tension of the springs 24. The bearing of the spring-bar against the guard will at the same time operate to maintain the guard in its engaging position by reason of the frictional contact between the rear edge of the guard and the head of the bar. While I have found in practice that such retention is amply sufficient, yet if the car is subject to excessive vibratory action, the guard when in extended and engaging positions may also be held by means of a chain or chains 27 running from the main frame 5 to connect with the frame of the guard. These chains will prevent the guard from slipping off the end of the spring-bar.

In the operation of the fender, as will later be more fully explained, the guard may be moved into an engaging position either from an inoperative vertical position or from an operative inclined position. In either case the operation will be to turn the guard to its engaging position and at the same time draw it forward against the tension of the springs 24 until the rear edge of the guard will slip over the forward bent end or head of the spring-bar 25 and bear frictionally against the same, which defines the engaging position of the guard. The guard is then in a position to be tripped into an inclined operative position.

For the purpose of preventing the guard from being accidentally lifted when in an engaging position the following means are provided: Pivoted to the respective guard supports or hangers 11 are dogs 28. These dogs are adapted and arranged to engage parts of the portions 9 of the main frame for preventing a further forward movement thereof when the guard is in an engaging position. For this purpose each of the respective portions 9 of the frame 5 is provided with backwardly and outwardly extending turned portions 29 presenting an edge 30 and with which edges the respective dogs are adapted to have engagement when the guard is occupying its engaging position (see Figs. 1 and 3). By reason of the manner of their engagement the dogs prevent only upward movement of the guard when in an engaging positon. They do not interfere with the movement of the guard from an engaging to an inclined operative position, as may be seen by reference to Fig. 4. If it is desired to lift the guard from an engaging to an inoperative vertical position, as shown in the dotted lines of Fig. 1, then it is necessary to disengage the dogs, which may be effected by lifting chains 31 accessible to the operator of the car. The dogs are automatic in their action in the sense that they will gravitate to their proper engaging positions when the guard itself is in a proper engaging position.

Before referring to the mechanisms operating to automatically trip the guard from an engaging to an operative inclined position, attention is directed to means operating to limit the operative inclined position of the guard with respect to the roadbed over which the car is passing when the guard is tripped or dropped to occupy such position. This means comprises adjustable stops 33 consisting of screws or bolts threaded to extend through the extensions 29 to the portions 9 of the main frame. As the guard is dropped to an inclined engaging position, its pivoted guard supports must swing backwardly with relation to the frame 5, and it is the engagement of the rear edges of these respective supports with the adjustable stops 33 which limits the inclined position of the guard, the adjustment of such inclined position being secured simply by adjustment of the respective stops.

Referring now to the means for tripping the guard from an engaging position to an inclined operative position. 35 represents a rod carried by the guard and disposed at about the center thereof to extend from a point adjacent the rear edge of the guard forward loosely through its frame at the forward edge thereof, which provides a bearing therefor, and thence some little distance beyond this edge. The extension of the rod is in a direction substantially parallel with that of the direction of the car to which the fender is secured. At the forward end of the rod 35, beyond the forward edge of the guard, the rod connects with a rail 36 extending parallel with said edge and for a distance substantially equal to the full width of the guard. It will thus be seen that the disposition of the rod 35 and rail is such that as the rail is moved toward and away from the front edge of the guard the rod 35 will be moved longitudinally by it to have a backward and forward movement. These connected parts are further connected and reinforced by rods 37 which connect with the rod 35 near the rear end thereof, thence extend diagonally in opposite directions to the forward edge of the guard and there connect with rods 38 respectively, arranged parallel with the rod 35 and extending loosely through the frame at the forward edge of the guard which provides a bearing therefor, and thence forward beyond said edge to connect with the rail 36. Thus connected the combined rods and rail form a sliding frame movable inwardly or outwardly as the rail is moved toward the forward edge of the guard or away from the same, with the advantage that such movement may be obtained wherever stress or force is applied to the rail for effecting such movement, whether at the center of the rail or at points at or near the ends thereof.

Carried by the rod 35 at the rear end thereof is a latch 39 presenting an inclined or beveled edge 40. This latch is contained within a socket or guard 41 secured to the frame of the guard. The latch is movable with the rod 35 and when this latch is in a forward-extended position, or, in other words, when the rail is in its outermost position away from the front edge of the guard, the latch will occupy a position, within its casing or socket, out of engagement with the head 26 of the spring-bar 25, which is operating to hold the guard in an extended and engaging position as aforesaid. The arrangement of the parts is such, however, that when the rail is moved inwardly to approach the forward edge of the guard the rod 35 will be moved to a position where the latch carried by it will engage the head 26 of the spring-bar, the inclined edge of the latch drawing against this head and lifting it out of engagement with the rear edge of the guard. Thereupon the guard, no longer supported, will drop from its engaging position to its inclined operative position and simultaneously become retracted by the springs 24.

The method of using the fender and its operation is as follows: Assuming the guard to be either in an inoperative vertical position, as shown in the dotted lines of Fig. 1, or in its inclined operative position, in either case the guard may be set in its engaging position by first turning it to a position approximately its engaging position. Draft is then applied to the rail 36 of the tripping mechanism, drawing this rail away from the forward edge of the guard and moving the tripping mechanism into a position where the latch carried by it will no longer engage the head 26 of the spring-bar 25. The disengaged position of the latch is determined by the extent to which the rail may be withdrawn from the guard and this is defined by the length of the rods 38 inasmuch as the diagonal rods 37, connecting therewith, will draw against the frame at the forward edge of the guard when the rail has been drawn forward to the full extent of its forward movement. After the rail has been thus drawn forward away from the edge of the guard, draft thereon is continued and the entire guard pulled forward against the tension of the springs 24 until the guard may be turned to a precise engaging position with the rear edge thereof bearing against the head 26 of the spring-bar 25. The guard will then be held in its engaging position by this bar and also by the chains 27, if such be used as aforesaid. It will also be held from upward dislodgment by the dogs 28. The fender is now set.

Assume now that the car is in motion and the guard strikes an object in the path of the car. Thereupon the impact of the object will drive the rail of the tripping mechanism backwardly against the forward edge of the guard. The spring-bar 25 will then become released by the latch and the guard will turn downwardly and backwardly to a proper inclined operative position as determined by the stops 33, having also at the same time a positive and pronounced backward movement away from the object by the action of the springs 24, which will tend to prevent the object from getting beneath the fender.

In Fig. 6 there is shown a modified construction for holding the guard in an engaging position, its special advantage being a more positive retention of the guard. It is preferably employed when the fender is applied to a car subject to considerable vibratory action.

Secured to the respective parts 9 of the main frame 5 to project therefrom in substantially the same plane as the guard when in an engaging position, are bars 42. These bars are of such length that the ends thereof will engage the rear edge of the guard when the guard has been drawn forward into an extended and engaging position for defining such position in substantially the same manner as the spring-bar 25 of the construction first described. Mounted upon the guard adjacent the rear edge thereof are rods 43 and 44, respectively. These rods are arranged to be longitudinally movable in opposite directions transverse the guard to engage the bars 42 by the ends of the rods entering holes or openings therein. The rods 43 and 44 are pivotally attached, respectively, to the opposite ends of a link 45 pivoted to the frame of the guard at the rear edge thereof at the point 46. The rods 43 and 44 extend also through guides 47 secured to the guard. Pivotally connecting with the link 45 is an arm 28 to the end of which is pivotally secured the rod 35 of the tripping mechanism. The angular disposition of the link 45 and lever arm 48 attached to it, with relation to the rod 35, is such that when the rail 35 of the tripping mechanism is drawn away from the forward edge of the guard into an operative position, thereupon the rods 43 and 44 will be extended to engage the respective bars 42 for supporting and holding the guard in an engaging position, assuming of course that the guard has been first drawn forward into an extended and engaging position against the tension of the springs 24. When, however, the rail is moved backward into engagement with the rear edge of the guard, the respective rods 43 and 44 will be moved inwardly out of engagement with the bars 42 releasing the guard into an inclined operative position as aforesaid, the operation of the fender and the method of using the same in other respects being precisely the same as before described.

Having thus fully described my invention, I claim and desire to secure by Letters Patent of the United States:—

1. In a fender, the combination comprising a guard, supports bearing said guard and upon which said guard is movable to occupy extended or retracted positions, means for pivotally mounting said supports whereby the guard may occupy an engaging position or move downwardly therefrom into an operative position, tensional means normally operating to hold said guard in a retracted position upon its supports, and a releasable holding means for holding said guard in its extended and engaging positions whereby upon the release of said holding means said guard may be movable to occupy its operative position and simultaneously be retracted by said tensional means.

2. In a fender, the combination with a supporting frame, of a guard, supports pivoted to said frame and bearing said guard and in which said guard is movable to occupy extended and retracted positions, means for pivotally securing said supports to said frame whereby said guard may turn to occupy an engaging position or gravitate therefrom to occupy an operative position, tensional means normally operating to hold said guard in a retracted position with relation to said supports, means for holding said guard in its extended and engaging positions against the tension of said tensional means, and means for releasing said guard from said holding means whereby it may occupy its operative position and simultaneously assume its retracted position by the operation of said tensional means.

3. In a fender, the combination with a supporting frame, of a guard, supports pivoted to said frame and bearing said guard and in which said guard is movable to occupy extended and retracted positions, means for pivotally securing said supports to said frame whereby said guard may turn to occupy an engaging position or gravitate therefrom to occupy an operative position, tensional means normally operating to hold said guard in a retracted position with relation to said supports, means for holding said guard in its extended and engaging positions against the tension of said tensional means, and a tripping mechanism for releasing said holding means whereby said guard may turn to occupy its operative position and simultaneously assume a retracted position by the operation of said tensional means.

4. In a fender, the combination with a supporting frame, of a guard, supports bearing said guard and in which said guard is movable to occupy extended and retracted positions with relation to said supports, means for pivotally mounting said supports on said frame above the plane of said guard whereby said guard may turn to occupy an engaging position or gravitate therefrom downwardly and backwardly to occupy an operative position, tensional means normally operating to hold said guard in a retracted position with relation to said supports, releasable means for holding said guard in its extended and engaging positions against the tension of said tensional means, and means for releasing said guard from said holding means whereby it may turn to occupy its inclined operative position and simultaneously assume its retracted position by the operation of said tensional means.

5. In a fender, the combination with a supporting frame, of a guard, supports pivoted to said frame and bearing said guard and in which said guard is movable to occupy extended and retracted positions, means for pivotally securing said supports to said frame whereby said guard may turn to occupy an engaging position or gravitate therefrom to occupy an operative position, tensional means normally operating to hold said guard in a retracted position with relation to said supports, means for holding said guard in its extended and engaging positions against the tension of said tensional means, and a tripping mechanism carried by said guard for releasing said holding means, said tripping mechanism comprising in part a rail arranged beyond the forward edge of said guard and movable toward and from the same whereby upon movement of said rail toward the edge of said guard said holding means may become released and the guard turn to occupy its operative position and simultaneously assume its retracted position by the operation of said tensional means.

6. In a fender, the combination with a supporting frame, of a guard, means for securing said guard to said frame whereby said guard may be movable to occupy extended and retracted positions with relation to said frame and have also a pivotal movement with relation thereto from an engaging position to an operative position, tensional means normally operating to hold said guard in a retracted position with relation to said frame, means for holding said guard in its extended and engaging positions against the tension of said tensional means, and a tripping mechanism whereby said holding means may become automatically released and said guard turn to occupy its operative position and simultaneously assume a retracted position by the operation of said tensional means.

7. In a fender, the combination with a supporting frame, of a guard, supports bearing said guard, means for pivotally mounting said supports on said frame above the plane of said guard whereby said supports may swing and said guard turn to occupy an engaging position or gravitate downwardly and backwardly to occupy an operative position, means for securing said guard to said pivoted supports whereby it may have a determinate extended and retracted movement with relation thereto and to said frame, tensional means connecting with said supports and with said guard, normally operating to hold said guard in a retracted position with relation to said supports and said frame, releasable means for holding said guard in an extended and engaging position against the tension of said tensional means, a tripping mechanism carried by said guard, the same comprising in part a rail arranged beyond the forward edge of said guard and movable toward and away from the same, and means whereby said tripping mechanism may release said holding means for releasing said guard into an operative position when said rail is moved backward in the direction of the forward edge of said guard.

8. In a fender, the combination with a supporting frame of a guard, pendant supports angularly connecting with said guard at the rear thereof, means for pivotally mounting said supports on said frame above the plane of said guard whereby said supports may swing and said guard turn to occupy an engaging position or gravitate downwardly and backwardly to occupy an operative position, means for securing said guard to said pivoted supports whereby it may have a determinate extended and retracted movement with relation thereto and to said frame, tensional means normally operating to hold said guard in a retracted position with relation to said supports and said frame, releasable means for holding said guard in an extended and engaging position against the tension of said tensional means, the same comprising in part releasable rods carried by said guard and having a releasable engagement with said frame, a tripping mechanism carried by said guard and having a forward and retracted movement with relation thereto, said tripping mechanism comprising a part arranged beyond the forward edge of said guard, and means whereby said tripping mechanism may release said rods into a disengaging position as said tripping mechanism is moved backward on said guard.

FRANK ROBINSON.

Witnesses:
JOHN E. R. HAYES,
M. E. FLAHERTY.

Copies of this patent may be obtained for five cents each, by addressing the "Commissioner of Patents, Washington, D. C."